Patented Apr. 6, 1926.

1,580,038

UNITED STATES PATENT OFFICE.

BIRGER FJELD HALVORSEN, OF OSLO, NORWAY, ASSIGNOR TO NORSK HYDRO-ELEKTRISK KVAELSTOFAKTIESELSKAB, OF OSLO, NORWAY.

PROCESS FOR THE PRODUCTION OF AMMONIA FROM GASES CONTAINING CYANIDE OF HYDROGEN.

No Drawing. Application filed February 16, 1925. Serial No. 9,709.

*To all whom it may concern:*

Be it known that I, BIRGER FJELD HALVORSEN, a subject of the King of Norway, residing at Oskars gate 71, Oslo, Norway, have invented certain new and useful Improvements in Processes for the Production of Ammonia from Gases Containing Cyanide of Hydrogen; and I do hereby declare the following to be a full, clear, and exact description of the invention, such as will enable others skilled in the art to which it appertains to make and use the same.

As it is known ammonia can be obtained by producing in an electric arc as an intermediary product cyanide of hydrogen from hydrogen, nitrogen and carbon and then reacting upon the cyanide of hydrogen with water vapour in the presence of a catalyst to form ammonia. In this process the introduction of the water vapour into the gas is, however, in practice combined with various drawbacks. For instances, a comparatively large excess of steam has to be used. The gas and the catalyzer will then very easily obtain a temperature that is not very favourable for the process. In the subsequent absorption the content of water steam in the gases causes an undesirable temperature in the apparatus. Further it is not easy in practice to add the proper amount of steam.

The present invention has for its object a process whereby these drawbacks can be avoided. It has been discovered that a thorough decomposition of the cyanide of hydrogen is obtained when a quantity of oxygen or air calculated to produce the required water vapour is introduced into the gas mixture containing hydrogen and cyanide of hydrogen. The oxygen then reacts with a part of the hydrogen present in excess in the gas which varies from 40% to 50% of the mixture and forms water vapour, which thereupon converts the cyanide of hydrogen into ammonia and carbonic oxide (according to the equation $HCN+H_2O = NH_3+CO$). The decomposition takes place quantitatively and very evenly while the temperature rises very slowly. If air is used there is the advantage that nitrogen is introduced at the same time whereby the nitrogen that is necessary for the formation of cyanide of hydrogen in the electric furnace is brought into the system, as the gases, after having passed through the absorption system and after having been enriched in carbon or hydrocarbons are again blown through an electric arc.

This process is advantageously carried into effect in combination with the production of cyanide of hydrogen in an electric furnace but it is obvious that the process can be carried out quite independent of the origin of the hydrogen cyanide.

The following may be stated as an example of how the process may be effected:

A gas rich in hydrogen and containing 21.3 milligrammes of cyanide of hydrogen per litre was conducted over a catalyzer that was heated to 400° at a rate of 20 litres per hour. 2 litres of air were added per hour. 213 grammes of cyanide of hydrogen were used. From this 132 grammes of ammonia were produced. Consequently the output of ammonia was 99 per cent of the cyanide of hydrogen used. The catalyst can conveniently be a mixture of iron and chromium oxides.

When the gas mixture containing hydrogen cyanide is obtained by passing hydrogen nitrogen and carbon or carbonaceous materials through an electric arc it usually contains an excess of hydrogen sufficient to produce the required proportion of water vapour. If the cyanide of hydrogen gas to be treated does not contain sufficient hydrogen additional quantities of hydrogen must be added to the gas before it is passed into the catalyst which may be any of those heretofore used, such as metals and their oxides, such as iron oxide, chromite, aluminium oxide &c, &c.

I claim:

1. Process for the production of ammonia comprising the steps of adding to a gas mixture which contains hydrogen and cyanide of hydrogen a quantity of oxygen and passing the gas mixture at a raised temperature over a catalyzer to convert the cyanide of hydrogen into ammonia.

2. Process for the production of ammonia, which comprises adding to a gas mixture of hydrogen and hydrogen cyanide a gas containing oxygen, and passing the mixture at an elevated temperature over a catalyst, said oxygen-containing gas being sufficient to produce the quantity of water required to react with the hydrogen cyanide to form ammonia.

3. The process of producing ammonia, which comprises adding to a gas mixture containing hydrogen and hydrogen cyanide a sufficient quantity of air to form the water required for the conversion of the hydrogen cyanide into ammonia, and passing the mixture at a raised temperature over a catalyst.

4. The process of producing ammonia, which comprises adding to a gas mixture containing hydrogen and hydrogen cyanide, a sufficient quantity of air to form the water required for the conversion of the hydrogen cyanide into ammonia, passing the mixture at a raised temperature over a catalyst, removing the ammonia and enriching the residual gases with a hydrocarbon, and passing the mixture through an electric arc for further formation of hydrogen cyanide.

In testimony that I claim the foregoing as my invention, I have signed my name.

BIRGER FJELD HALVORSEN.